United States Patent [19]

Harpster

[11] 4,255,968

[45] Mar. 17, 1981

[54] FLOW INDICATOR

[75] Inventor: Joseph W. C. Harpster, Galena, Ohio

[73] Assignee: Intek, Inc., Galena, Ohio

[21] Appl. No.: 46,670

[22] Filed: Jun. 8, 1979

[51] Int. Cl.³ .............................................. G01F 1/68
[52] U.S. Cl. ...................................................... 73/204
[58] Field of Search ........................................ 73/204

[56] References Cited

U.S. PATENT DOCUMENTS

| | | | |
|---|---|---|---|
| 2,729,976 | 1/1956 | Laub | 73/204 |
| 2,953,022 | 9/1960 | Laub | 73/204 |
| 3,246,515 | 4/1966 | Martino | 73/204 |
| 3,800,592 | 4/1974 | Jones, Jr. | 73/204 X |
| 3,931,736 | 1/1976 | Olmstead | 73/204 |
| 4,028,689 | 6/1977 | Schopp | 73/204 |

OTHER PUBLICATIONS

Tobin "Development of a Clamp-On Flowmeter", Proceedings of 18th Intern. ISA Aerospace Symposium, vol. 18, 5/1972, pp. 338-340.

*Primary Examiner*—Herbert Goldstein
*Attorney, Agent, or Firm*—Mueller & Smith

[57] ABSTRACT

An all solid state transducer and electronic system is disclosed for measuring flow through the use of a small, low temperature heater. The heater transmits an amount of heat to the flowing medium dependent on flow rate. A first temperature sensor is located near the heater and within its thermal influence. A second temperature sensor is thermally isolated from the heater. The heater and first sensor are located relative to each other such that the difference between the temperature sensors is proportional to the logarithm of the flow rate.

13 Claims, 9 Drawing Figures

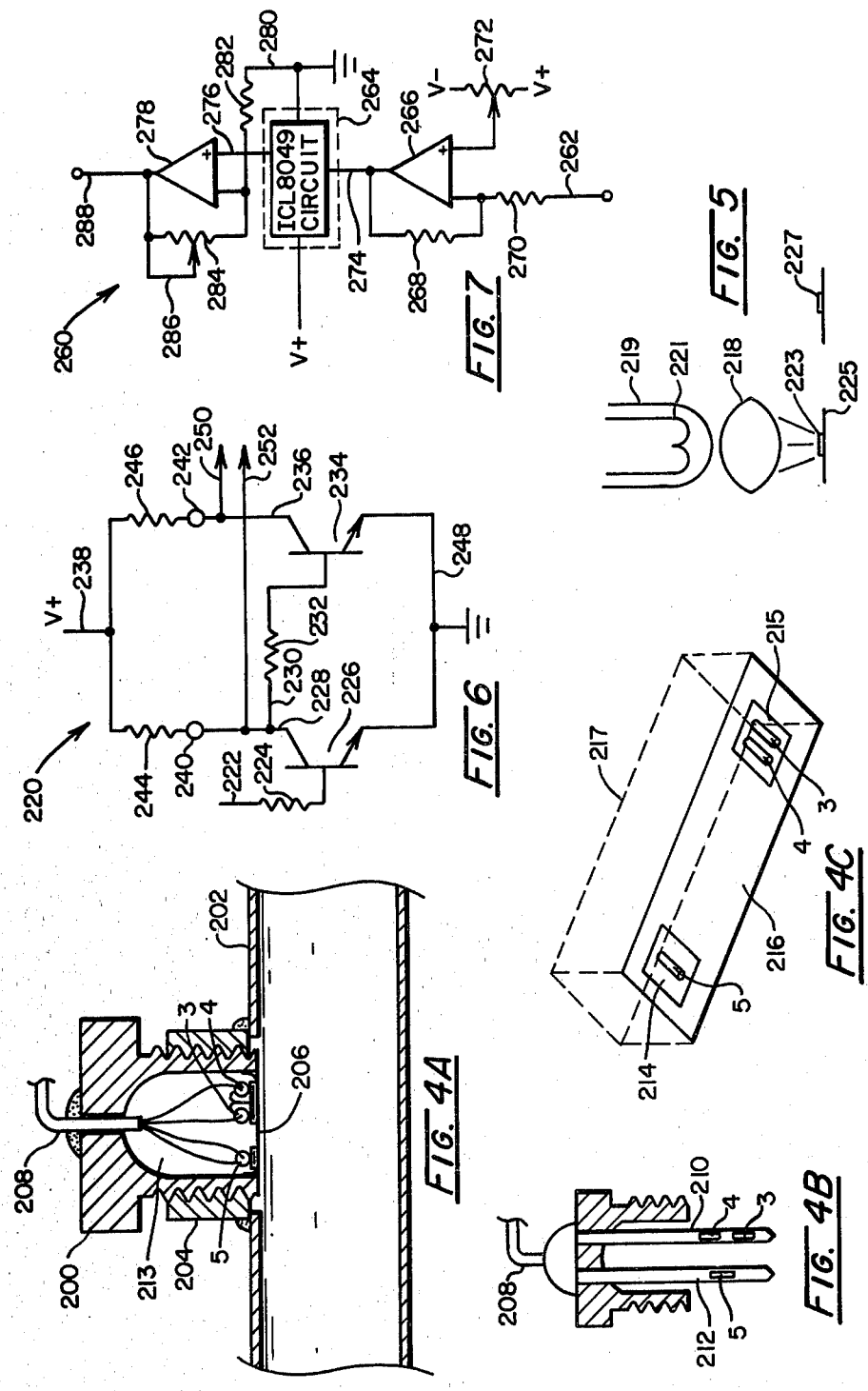

FLOW INDICATOR

BACKGROUND OF THE INVENTION

From the handling of large volumes of bulk materials in industry to the measurement of minute amounts of species in the laboratory, there has always been a need to measure flow. Although many design variations are observed, flow apparatus for the measurement of most materials today have been constructed using essentially two principles. These are: (1). the measurement of pressure differential across a restriction in a conduit and (2). the measurement of rotational speed of a propeller primarily in an apparatus commonly known as the turbine meter. Because of the limitations of these two approaches, highly specialized and expensive flow rate apparatus have been developed to meet the special needs of particular flow measurement requirements. These specialized instruments include, for example, employment of Doppler shift measurements, apparatus using radioactive sources, the coupling with hydrogen atoms in nuclear magnetic resonance measurements employing phase locked loop detection techniques, deflection of a curved tube through which materials pass imparting a measurable force tending to straighten the tube, vortex shedding methods and the measurement of a magnet induced electric field. The induction flow meter has been employed for measurement of electrically conductive liquids as far back as 1917.

Thermal techniques have been previously employed to measure flow. The hot wire fluid/air velocity transducer consists basically of an electrically heated fine wire which is immersed in the stream and cooled by the flow. The associated resistance change is detected and provides a measure of flow. Another method is the injection of a small amount of heat into the stream and measuring the time-of-flight between two fixed points in the stream. Still others employ massive and costly machined parts effectively serving as an environmental heat sink and a heater to measure flow.

Systems employing a line restriction, a shaped venturi tube section or orifice plate and the associated measurement of pressure differential across the restriction haved the limitation that the stream is restricted. Materials having high viscosity, pastes and pneumatically pumped solids cannot be effectively measured by this method. The turbine meter is not effective for small flow rates, it requires a seal around a rotary shaft and bearings, it has the same flowing material restrictions as the previous techniques, it results in error or failure when subjected to varying temperature environments and induces vibration or pulsation into the stream. The remaining flow apparatus types are limited by being of the immersion type, not applicable to virtually all materials, delicate, not temperature compensated, require uniform and homogeneous flowing liquids or gases or are costly to manufacture.

Current needs for low cost, high reliability flow indicators having the application flexibility of the instant invention are demanding. To the present, there has been no flow indicator device meeting the stringent, cost effective demands placed on it by the automotive industry for monitoring fuel flow. Another application unsatisfied by prior art devices is the measurement of corrosive materials flow. Further, there is no available instrument to measure pneumatically pumped powdered coal in a fluidized bed or primary heating equipment. Still another heretofore unsatisfied application is the measurement of other pneumatically pumped solids such as acrylic particles in the plastics industry and metal/gas mixtures in the flame spray and plasma deposition industry. Another unsatisfied application resides in the measurement of flow of thick pastes such as slip materials in the ceramic industry. Therefore, a system and device is needed which overcomes the limitations of high cost and inadequacy of prior art of those earlier devices employing components and arrangements subject to high failure rate and high initial and maintenance costs.

SUMMARY

The present invention is addressed to a method, system and apparatus for measuring flow rate and providing flow switch action in a manner overcoming the disadvantages otherwise attendant in other flow indicator apparatus. While the invention does employ the principle of heating, it does this in a manner which is not necessarily intrusive to the stream, provides heat flow sensing which is independent of stream temperature and utilizes low cost, readily available solid state components. As a consequence, a practical flow measuring apparatus is realized, suitable for measuring solids, liquids and gases or mixtures of these, be they corrosive or otherwise, and is useful for industrial or laboratory applications.

A feature and objective of the invention is to provide a flow sensing transducer and associated electronics to measure material flow which is non-intrusive to the conduit containing the flowing material by measuring the amount of heat transmitted to a region of the flowing material located in proximity to the heater and sensing components of the transducer affixed to the outside walls of a conduit section.

Another objective of the invention is to provide an arrangement of noted components of the transducer providing an approximate logarithmic relation between output signal and flow rate.

Another objective of the invention is to provide a means in the noted electronics for output signal expansion to obtain various degrees of range accuracy for measuring flow rate.

Another objective of the invention is to provide a means in the noted electronics to provide switch action for operation of a relay or alarm for flow rates above or below a particular value.

Another objective of the invention is to provide a means for optimizing transducer design for various types of materials being measured for flow rate which includes non-intrusive, intrusive, submergence and surface mountable transducers.

Another objective of the invention is to provide a means for increasing the response time of the transducer through heating by optical coupling.

Another objective of the invention is to provide a means for measuring flow rate and direction of flow in large regions using an intrusive probe transducer design.

Other objects of the invention will, in part, be obvious, and will, in part, appear hereinafter.

The invention, accordingly, comprises the system, method and apparatus posessing the design, construction steps and arrangement of components which are exemplified in the following detailed disclosure. For a fuller understanding of the nature and objects of the invention, reference should be made to the following detailed description taken in connection with the accompanying drawings.

BRIEF DESCRIPTION OF THE DRAWINGS

FIG. 4A, 4B, and 4C are schematic portrayals of different transducer configurations suitable for particular applications of flow measurement; and FIG. 5 is a schematic portrayal of an optically coupled transducer arrangement for fast response measurements; and FIG. 6 is a schematic portrayal of flow level display; and FIG. 7 is a schematic portrayal of a method for signal linearization.

DETAILED DESCRIPTION

In its most basic concept, the inventive system provides for the removal of heat generated by a small heater located outside the inner confining walls of a conduit through which a material is flowing. The heater is in thermal communication with the flowing material through the walls of the conduit or a simulation thereof. The conductance of heat through the wall increases as the material flow is increased, causing a lowering of temperature of both the heater and its immediate surroundings. A measure of the temperature differential between regions thermally remote from and near to the heater and within its thermal influence provides a calibratable signal, the value of which is in relation to flow.

In its most basic concept, the theory of the invention shows the existence of mathematical relationships which are different from most shown in prior art. For example, all differential pressure flow meters show a flow rate to be dependent on the square root of the measured pressure differentials across a line restriction.

The magnetic method shows the flow rate to be linearly dependent on the measured electric field generated by a conductive flowing medium passing through the magnetic field. The hot wire anemometer is a system based on stream cooling of an immersed heater which relates the flow rate Q to the stream velocity through the relationship $$Q = K(C_1 + C_2 v^{\frac{1}{2}})$$

for the constant resistance method, and $$Q = K\, Ra(C_1 + C_2 v^{\frac{1}{2}})/(C_1 + C_2 v^{\frac{1}{2}} - i)$$

for the constant current method. In the above, K is the flow coefficient relating theory to actual flow, $C_1$ and $C_2$ are empirical constants, Ra is a reference resistance and i is the value of current.

Figure 1:
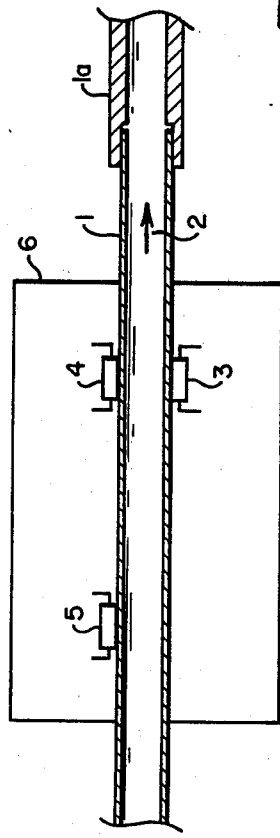
FIG. 1 is a schematic portrayal of a non-intrusive transducer showing a possible component arrangement.

Looking to FIG. 1, there is shown a schematic representation of a flow measuring transducer consisting of a conduit section 1, having an inside diameter equal to that of the process conduit 1a confining a flowing material 2. Coupled in thermal route exchange relationship with the wall of conduit section 1 is a small heater 3 represented as a resistance heater. In a preferred embodiment, heater 3 is powered from a fixed power source, however, a controlled power input to the heater can be utilized to carry out measurements in accordance with the invention. The amount of thermal energy generated by heater 3 may be quite small, for example, a heater elevating the fluid temperature by 1° or 2° C. being adequate to carry out accurate flow measurement in accordance with the invention. Also positioned in relatively close proximity to heater 3 is a temperature sensor which is so positioned as to reside within the thermal influence of heater 3. In this regard, to assure response to the influence of heater 3, sensor 4 may be coupled with conduit section 1 utilizing conductive sheaths and the like. Sensor 4 may be present as a forward biased diode, a thermister, a tempisteor or thermocouple. Spaced up-stream of both heater and sensor 4 is a second sensor, 5, which is positioned adjacent to conduit section 1 again in a position such that it is capable of measuring the temperature of the environment of the fluid at the up-stream location of its position. Concerning the latter positioning, it is important to the practical implementation of the system of the invention that sensor 5 be positioned in relative thermal isolation of the influence of heater 3. This can be carried out by spacing sensor 5 a predetermined distance up-stream from heater 3 or by so selecting the materials of the conduit section 1 as to permit a more closely adjacent spacing. Sensor 5, the "low" temperature sensor, determines the temperature of the unperturbed stream. Sensor 4, a relatively "high" temperature sensor, determines to some extent the temperature of the fluid 2 in the region of heater 3 as indicated above. To assure a proper thermal relationship between heater 3 and sensor 4, it has been found to be of value to mount both of these components within a common copper sheath which is mounted about conduit section 1 and so attached as to exert a thermal influence upon the fluid passing therethrough. This provides a path of heat flow into the fluid being evaluated between the heater and sensor which has been found to improve the performance of the system. Generally preferred is an arrangement wherein a single conductive sheath or mounting component formed for example of copper, surrounds and retains both heater 3 and sensor 4 in spaced apart relationship and in adjacency with conduit section 1. Generally, soldering or the like has been found acceptable for small flow rate measurement devices fabricated in accordance with the system of the invention. Insulation 6, surrounds the elements of the transducer so as to make them insensitive to ambient temperature. It is understood that other arrangements for the heater and temperature sensors are also possible. Some examples of these are presented later.

The theoretical volume flow rate $Q_{theor.}$, of material through a flow measuring transducer according to the invention, for example having circular cross-section diameter D, is given by the expression $$Q_{theor.} = \pi D^2/4v \qquad (1)$$

where $v$ is the average velocity of the material stream being evaluated. Letting $\Delta T_0(v=0)$ represent the temperature differential between the heated and unheated temperature sensors 4 and 5, for zero stream velocity and $\Delta T(v)$ be the temperature differential between the two sensors for a stream velocity of $v$, then the difference between these two values, $\Delta T$, is relatable to flow through the relationship $$\Delta T = \Delta T_0(v=0) - \Delta T(v) = C_1 Fctn\,(v) \qquad (2)$$

For the particular case where the process pipe is stainless steel and the heater and heated sensor connected together with a single thin sheath or mounting component of copper soldered to the process pipe and with the heater and sensor separated by one-fourth the pipe circumference, Equation (2) has the form $$\Delta T = C_1 \ln(v+a)/a \tag{3}$$

which was determined empirically with $a$, an empirically derived constant.

Equation (3) may be solved for $v$ and substituted into Equation (1), with the result:

$$Q_{theor.} = (a\pi D^2/4)[\exp(\Delta T/C_1) - 1] \tag{4}$$

The exponential dependence of flow rate on measured temperature differential provides a function easily interpreted graphically to obtain calibration charts or developed electronically to provide a linear readout.

As indicated above, placement of the two temperature sensors with respect to the heater is critical to achieve proper results. Experiments show that $\Delta T$ can initially take on negative values resulting from decreasing temperatures of the reference sensor where a thermal influence is exerted by the heater upon the upstream sensor. Further, if the high temperature sensor is located too close to the heater, other mathematical relationships result; these relationships may not be suitable for ease of linearization. For example, it has been found that stacking sensor 4 over heater 5 decreases sensitivity of the system and develops a power law relationship between output voltage and average stream velocity.

It should be recognized that the two sensor method provides measurement of flow independent of stream temperature; i.e., $\Delta T$ is not a function of stream temperature. However, it is recognized that the arrangement shown in FIG. 1 may be subject to reading error for pulsed temperature variations in the process stream. This occurs for the case where a thermal front moves between the low and high temperature sensor and taking a time longer than the effective time constant of the flow measuring transducer. If a high temperature front reaches the low temperature sensor, $\Delta T$ will be reduced resulting in a determined increase in flow rate. This condition will continue until the front reaches the high temperature sensor location at which time true flow rate indication as determined by $\Delta T$ measurement will be restored. For large diameter pipes "high" and "low" temperature sensors can be located on opposite ends of a diameter, thereby eliminating this effect.

Dividing the stream into two parallel paths with heater and sensor in one and reference temperature in the other would be another way to eliminate the above problem. Simplicity of design and construction of the transducer as shown in FIG. 1 is a low cost feature of the instant invention.

Figure 2:
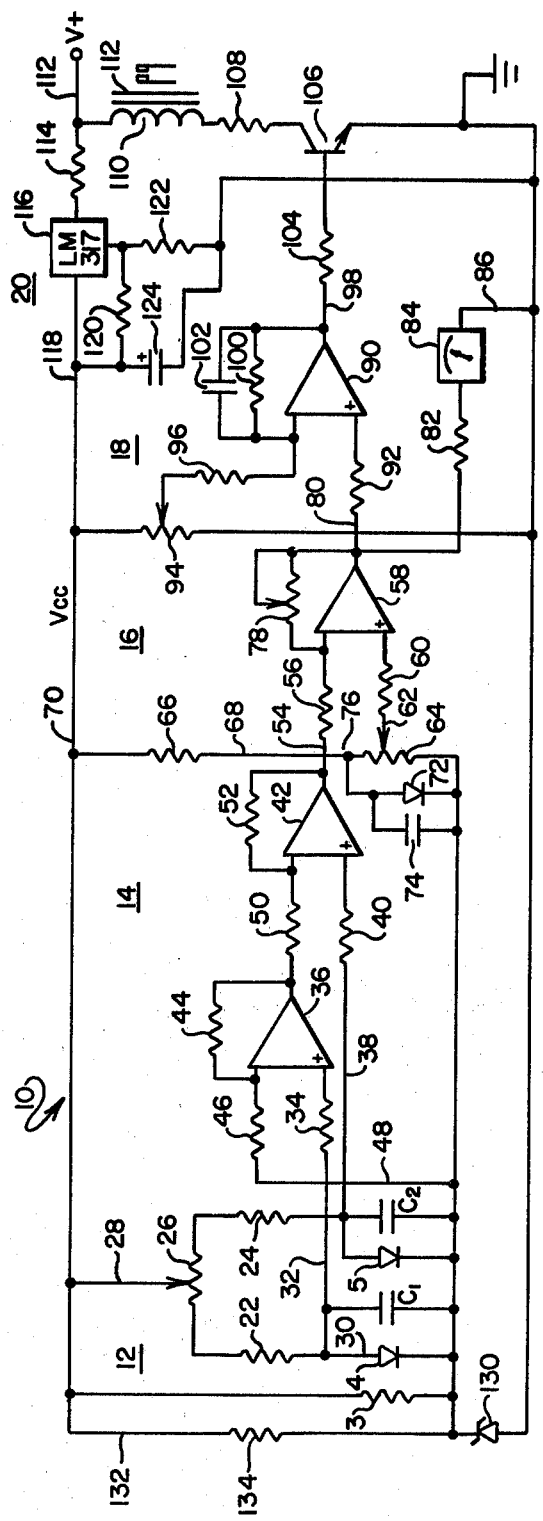
FIG. 2 is a schematic portrayal of an electronic arrangement compatible with the transducer of FIG. 1.

In reference to FIG. 2, there is shown a circuit schematic at 10 of basic electronic components sufficient to measure flow through a transducer configured as shown in FIG. 1. In keeping with the same number notation used in FIG. 1, elements 3, 4, and 5 are respectively "heater," "high temperature sensor" and "low temperature sensor". Circuit 10 basically includes a current balancing network represented generally at 12 which operates in conjunction with sensors 4 and 5, adjacent to which is a differential amplifier stage shown generally at 14. Next to network 14 is a main amplification network 16 which is associated with a switching amplifier network 18. Network 20 is a regulated power supply network. Returning to network 12, resistors 22 and 24 are connected through a variable resistor 26 to an associated wiper arm 28 to $v_{cc}$. This resultant network provides a constant but adjustable current supply to matched sensors 4 and 5 such that a relatively identical quantity of current can be applied to both of the sensors simultaneously. Capacitors $C_1$ and $C_2$ are connected as shown to eliminate any spurious noise which may appear across sensors 4 and 5 which are shown here as forward bias diodes. The heating element of the system is shown in the circuit in adjacency with sensor 4, it being recalled that sensor 4 will always be under the thermal influence of that heater. Line 30, within which sensor 4 is connected, is tapped by a line 32, extending through compensating resistor 34 to one input of an amplication stage 36. Similarly, line 38, within which sensor 5 is coupled, is tapped by a line, 38, extending through compensating resistor 40 to one input of a second amplification stage 42. Amplification stages 36 and 42 are coupled within network 14 as a differential amplifier for purposes of thermal stability. Looking in more detail to network 14, it may be observed that a feedback resistor 44 is connected between the output and opposite input of amplification stage 36, there is a resistor 46 being coupled betweend that second input and what will be described hereinafter as a pseudo ground. The output of amplification stage 36 is directed through a gain resistor 50 to one input of amplification stage 42, while the output thereof is coupled through feedback resistor 52 to the same input thereof. With the arrangement shown, network 14 provides a voltage signal at its output 54 which is representative of the difference in temperature as sensed between sensors 4 and 5.

Main amplifier network 16 is provided for responding to the output of network 14 at line 54 through a gain resistor 56, the latter being coupled to one input of a principal amplification stage 58. The opposite input to amplification stage 58 is coupled through a compensating resistor 60 to the wiper arm 62 of a resistor 64, the latter being connected between $v_{cc}$ and pseudo ground. Note the presence of a resistor 66 within line 68 which provides the latter interconnection. Inasmuch as $v_{cc}$ at line 70 may suffer variations in value, resistors 66 and 64 are associated with diode 72 and capacitor 74 for the purpose of assuring a constant voltage at point 76. This arrangement improves the performance of the entire circuit inasmuch as the reference voltage applied through resistor 60 to amplification stage 58 thus remains a fixed value. With the arrangement wherein a variable voltage is developed at arms 62 of resistor 64 as well as through the utilization of components 72 and 74, the operator is permitted the option of selecting a variety of reference levels asserted at the amplification stage and thus may adjust the sensitivity of the system to any of a variety of measured ranges of flow rates. For example, the system may be adjusted for higher sensitivity to high flow rates while rejecting signals representative of low flow rates. The gain of amplification stage 58 is adjusted by a variable feedback resistor 78 within an associated feedback loop.

The output of amplification network 16 is present at line 80 which may be directed to a variety of readout functions. For example, line 80 may lead through a limiting resistor 82 to an analog meter 84 the opposite input of which is coupled to ground through line 86. Similarly, output line 80 may be coupled to a high gain switching amplification network 18 which includes amplification stage 90, one input to which is coupled to output line 80 through compensating resistor 92. The opposite input to amplification stage 90 is coupled to a variable resistor 94 coupled between $v_{cc}$, line 70 and ground and having an input or arm coupled through gain resistor 96 to the noted input. The output of amplification stage 90 at line 98 is coupled through a high resistance feedback resistor 100 to one input thereof as well as through capacitor 102 to that input. With the arrangement, any imbalance between the set point established by resistor 94 and output 80 for example, such that the value at 80 is greater than that at the opposite input to amplification stage 90, the high gain drives the output high. Conversely, if the signal at line 80 is lower than that asserted at the second input side of stage 90, then the amplifier output is zero. The output of stage 90 at line 98 is passed through limiting resistor 104 to the base of transistor 106. The emitter of transistor 106 is coupled to ground, while its collector is coupled through resistor 108 and the winding 110 of a relay 112 to the unregulated input positive voltage of the system at line 112.

Line 112 leads through voltage dropping resistor 114 to the input of a voltage regulator represented at block 116. The output of regulator 116 at line 118 is set by the values selected for set resistors 120 and 122 in conventional fashion. In the same vein, the filtering capacitor 124 is coupled between line 118 and ground.

The arrangement with relay 112 is provided in the circuit to develop a perceptible, for example visible, indicia of a loss of fluid flow. In this regard, as fluid flow drops, the signal value at output line 54 increases. This signal then is fed to the inverting input of amplification stage 58 which serves to drive it down at its output line 80. As the level of the signal at line 80 falls below that set for the set point level at variable resistor 94, the output of amplification stage 90 at line 98 switches to zero, transistor 106 turns off and the energization of winding 110 ceases. Relay 112 may be present as a normally closed type and thus the contacts thereof will close to provide the closure of a circuit leading to the indicia such as a light horn or the like.

Mention is made earlier herein of a pseudo ground. In this regard a Zener diode 130 is coupled between ground and $v_{cc}$ through line 132, and current limiting resistor 134. This serves to improve the common mode voltage rejection of amplification stages 36 and 42 of amplification network 14.

Examples of commercially available components suitable for constructing a flow indicator for measuring and obtaining flow switch action for water is as follows: conduit section 1 is a ⅜ stainless steel tube measuring 7" in length, heater 3 is a standard ¼ watt 1K ohm resistor and temperature sensors 4 and 5 can be matched IN4001 diodes. Resistors 22 and 24 are 470 ohm and potentiometer 26 is 500K ohm, resistors 56, 60, 92, 96 and 104 are 1K ohm, resistor 66 is 5.6K ohm, resistor 82 is 3.3k ohm, resistor 110 is 68 ohm resistor 100 is 1 Meg ohm and potentiometers 64, 78 and 94 are 2K, 1 Meg and 2K ohms respectively. Regulator 116 is an LM 317, amplifiers 36, 42, 58 and 90 are one-quarter each of an LM 324. Transistor 106 is a 2N3904, relay 112 is a Guardian type 1330P and signal indicator 84 is a 3 ma full scale analog meter. Capacitors $C_1$, $C_2$ and 124 are 0.3, 0.3 and 1 $\mu f$ respectively.

Apparatus was assembled similar to the above description. The transducer was constructed as follows. The temperature sensors and heater were epoxied into small tubes made of 0.002" thick copper shim which had been soldered to the ⅜ stainless steel tube. A piece of shim measuring 0.25" on each side was soldered to the stainless steel tube between it and the smaller tubes containing heater 3 and sensor 4 such that this mounting component spaced heater 3 and sensor 4 apart by a distance of 0.25". A ¾" plastic pipe section was supported such as to surround the tubing and the space between was foamed. A six foot long four conductor cable connected to the transducer and its components to the remaining electronics. A supply voltage of +18 volts was applied to position 112 in FIG. 2. The heater was disconnected to set identical current flow through each temperature sensing diode.

Figure 3:
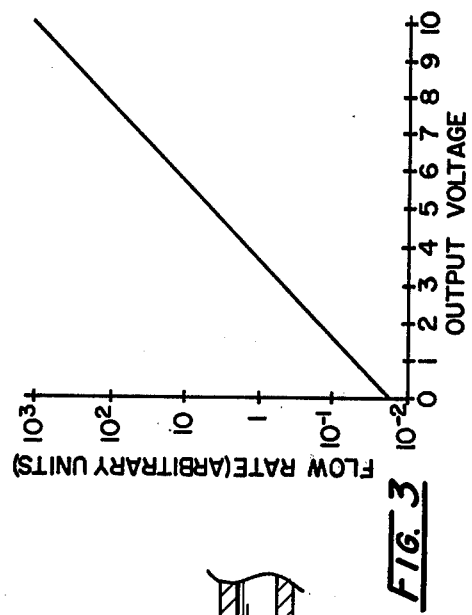
FIG. 3 is a curve showing the possible wide dynamic range of the system of FIG. 1 and FIG. 2.

Tests show the flow indicator to have great sensitivity to low flow rates. In normal applications output signal zero would be set for a minimum expected flow at arm 62 of resistor 64. In FIG. 3 there is shown a graph of flow rate vs. output voltage signal which is useful as a calibration curve. The indicated logarithmic character of the curve was determined to be somewhat a function of the relative arrangement of the temperature sensors and heater and of the electronics.

It is understood that other circuit arrangements can be used to obtain a suitable output signal in relation to flow and trip signal for flow switch action. One such arrangement would utilize a plus and minus power supply to eliminate the pseudo ground. Another would be the application of a controlled current to the heater such that the sensed differential temperature does not vary in which case the heater current would provide a signal in relation to flow. The requirement for matched diodes 4 and 5 for temperature compensation can be eliminated if another amplifier is connected such that its input senses sensor 5 and a portion of its output is added to one or the other inputs to amplifier 58. Input selection would depend on environmental temperature dependence of the two sensors.

Flow measurement transducer configurations other than the one shown in FIG. 1 are possible. Referring to FIG. 4, there is shown three other transducers. FIG. 4a shows how the heater 3 and two temperature sensors 4 and 5 are mounted in a non-intrusive threaded flow transducer 200, which consists basically of a normal NPT pipe plug drilled through the top to pass lead wires to the heater 3 and sensors 4 and 5 which themselves are attached in a manner described above to a 0.005" thick stainless steel cap 206 soldered to the bottom of the pipe plug. This flow transducer is mounted to a conduit 202 by means of a threaded sleeve 204 attached to the conduit confining flowing material 2. Insulation foam fills the cavity 213. The stainless steel cap 206 may be thicker or thinner depending upon the contemplated use or material whose flow is being evaluated. Obviously, the thinner the layer, the more sensitive the system becomes and a faster response time may be achieved. Conversely, with more crude materials, a thicker cap sheet structure can be utilized if flow sensitivity is not critical. In FIG. 4b there is shown an intrusive probe for installation into a process stream in the same manner as described for the non-intrusive probe of FIG. 4a. Heater 4 and temperature sensor 3 are epoxied into a stainless steel tube 210 sealed at the bottom and soldered to the threaded plug at the top. Another stainless steel tube 212 contains the reference temperature sensor 5. Lead wires (not shown) from the heater and temperature sensors extend out through the top of tubes 210 and 212 and connect to a cable 208. In FIG. 4c, there is shown an insertible flat plate arrangement suitable for measurement of gases. Additional flow mass fins could be attached to the flat plates 214 and 215 to improve heat transfer. Flat plate 216 is an insulator such as plastic and element 217 is a thermally insulating encapsulant. Wiring and connecting cable are not shown.

With respect to response time, the arrangement of FIG. 1 has a time constant of about 6 seconds following initial stabilization. Physical properties which dominate response time are the heat transfer rate and mass of the thermally varying components. In keeping with the intent of the invention, a low mass transducer configuration is shown in FIG. 5 of the immersion type having a response time of less than 1 millisecond. Optical coupling effected by lens 218 located between an electrically heated lamp having a transparent housing 219 and filament 221 and a low mass temperature sensor 223 containing a heat transfer surface 225 provide for fast heat transfer conditions and response time characteristics due to overall low mass. The reference sensor identical in construction with elements 223 and 225 is shown as sensor 227. The temperature sensors could be unencapsulated silicon diodes containing suitable passivation suspended by the necessary two electrically conductive wires of low mass.

Further, commercially available thin film or thin layer heat conductivity sensor elements can be located between the flowing stream conduit and the heater to obtain the calibratable signal in proportion to flow. The arrangement would closely approximate the linear stacking of the two temperature sensors and heater having fixed thermal independence media between them with the low temperature sensor located against the outside surface of the conduits.

In many applications, it will be found valuable to appraise the operator of the continuing monitoring of the flow indicator of the invention. Looking to FIG. 6, a circuit which may be incorporated with that of FIG. 2 to represent a flow condition above a given predetermined maximum as well as a flow below that maximum is revealed generally at 220. The input 222 of network 220 can be coupled to the circuit of FIG. 2 at a point intermediate 104 and the base electrode of transistor 106. Alternately, network 220 can be utilized to replace transistor 106 and its associated functional components. Assuming a high flow signal is present at line 222, that signal having a value close to supply voltage, it is impressed through limiting resistor 224 to the base of an NPN transistor 226. The collector of transistor 226 is coupled through line 228 and line 230 incorporating a limiting resistor 232 to the base of a second NPN transistor 234. The collector of transistor 234 is coupled through a line 236 and to v+ through line 238. Note that either side of line 238, line 236, incorporates an LED or incandescent bulb as at 240 and 242 which are associated with respect to limiting resistors 244 and 246. The emitters of transistors 226 and 234 are coupled by line 248 to ground.

With the arrangement shown, assuming a high fluid flow condition, the resultant higher voltage level at input line 222 serves to cause transistor 226 to turn on thus permitting current to energize LED 240. Inasmuch as line 228 in the vicinity of collector electrode of transistor 226 approaches ground level, transistor 234 is held off. Conversely, under low flow condition, the signal value at line 222 is near ground, transistor 226 is off and line 228 assumes a high value which is impressed across the base emitter junction of transistor 234, causing it to turn on and thus energize LED 242. With the arrangement, the operator is continually appraised that either a low flow or a high flow condition is at hand and that the system is in an operational state.

The system also shows two taps at lines 250 and 252 which may be utilized to provide a remote signalling arrangement or operate other suitable indicia or the like.

The form of signal which is output at line 80 and utilized, for example, to drive meter 84, is one which is logarithmic in character. For many applications, it may be found desirable to linearize this signal to permit integration procedures or totalize flow or output values to be displayed.

Looking to FIG. 7, a linearization circuit is shown generally at 260. Circuit 260 is provided having an input line 262 which would be coupled with line 80 of the circuit of FIG. 2. This signal, as described above, is logarithmic in nature. The principle component of circuit 260 is an anti-logarithmic amplifier circuit shown within dashed boundary 264 and available in the marketplace as a type ICL8049 component and associated circuit, marketed for instance by Intercil Corp., California. The characteristic of such components is that a positive going input signal thereto results in a negative going output signal. The latter signal will be exponentially amplified. For the instant application, however, it is necessary that the positive going logarithmic input signal result in a correspondingly positive going output signal proportional to flow. Recall from Equation (4) above that the theoretical flow rate is proportional to the exponent of the temperature differential, that differential being measured by the circuit. Thus, that temperature differential is proportional to the log of the flow rate. Therefore the signal at line 262 must be "exponentialized" by circuit 260 in order to develop a linear relationship between fluid flow or flow rate and the output signal of the system. To carry out this requirement, the input at line 262 is directed into an inverting amplification stage shown generally at 266 which includes equal valued feedback and input resistors shown respectively at 266 and 270 as well as a bias setting and variable resistor 272, the wiper arm of which is coupled with the non-inverting input of the amplification stage. With this arrangement, for example, a 10 volt setting may be established at the wiper arm of resistor 272 which derives a 10 volt output at line 274 for a zero output at line 262. Conversely, a 10 volt input at line 262 will result in a zero output at line 274. This provides a mathematical inversion, such that the output of component 264 at line 276 is positive going in complement with a corresponding positive going signal at line 262.

Now looking to the output at line 276, that output is directed to one input of a driving amplification stage 278, the opposite input to which is coupled through line 280 and resistor 282 to ground as well as through line 284 and feedback resistor 286 to output line 288. With the arrangement shown, the output at line 276 can be selectively amplified by adjustment of the wiper arm input to resistor 286.

Since certain changes may be made in the above-described apparatus and method without departing from the scope of the invention herein revealed, it is intended that all matter contained in the description thereof or shown in the accompanying drawings shall be interpreted as illustrative and not in a limiting sense.

I claim:

1. Apparatus for detecting the presence and measuring the flow of material along a path comprising:
    first, thermally responsive sensor means positionable adjacent said path for deriving a first output signal representing the thermal condition of said sensor means as influenced by said material flow;
    heater means positionable adjacent said path and located with respect thereto to thermally influence said first thermally responsive sensor means in a manner wherein the residual temperature deriving said thermal influence varies substantially as an exponential relationship between said first sensor means and said heater means;
    second, thermally responsive sensor means positioned remotely from said first thermally responsive sensor means and said heater means for deriving a second output signal representing a thermal condition of said flowing material; and
    comparison means responsive to said first and second output signals for deriving a third signal corresponding with the difference therebetween, said third signal being substantially proportional to the logarithm of the rate of flow of said material.

2. The apparatus of claim 1 in which said first thermally responsive sensor means and said heater means are mounted in mutually spaced relationship upon a common thermally conductive medium having a surface thermally influenced by said flow of material.

3. The apparatus of claim 1 including shield means surmounting said first thermally responsive sensor means, said heater means and said second thermally responsive sensor means for thermally isolating them from their ambient environment.

4. The apparatus of claim 1 in which:
    said path is defined by the wall of a conduit; and
    said first thermally responsive sensor means, said heater means and said second thermally responsive sensor means are mounted in mutually spaced relationship upon a thermally conductive sheet, said sheet being mounted upon a pipe fitting insertable within said wall, said sheet being mounted such that one side thereof is contactable with said material when said fitting is inerted within said wall.

5. The apparatus of claim 4 in which said first thermally responsive sensor means and said heater means are mounted in mutual adjacency upon said sheet, and said first and second thermally responsive sensor means and said heating means are located internally of said fitting.

6. The apparatus of claim 1 in which said heater means comprises:
    a source of radiation; and
    means for directing said radiation toward said first thermally responsive sensor means.

7. The apparatus of claim 1 in which:
    said first thermally responsive sensor means and said heater means are mounted mutually remotely upon a common, thermally conductive mounting component;
    said mounting component is mounted in thermal exchange relationship with a conduit positionable about said path in contact with said material and exhibiting a thermal conductivity less than that of said mounting component;
    said second thermally responsive sensor means is mounted in thermal exchange relationship upon said conduit at a remote position substantially without a thermal influence by said heater means.

8. The apparatus of claim 1 in which:
    said material is a fluid;
    wherein said first thermally responsive sensor means and said heater means are commonly mounted in mutually spaced relationship upon a first thermally conductive probe extendible into said fluid; and
    said second thermally responsive sensor means is mounted upon a second thermally conductive probe positioned remotely from said first probe and extendible into said fluid.

9. The apparatus of claim 1 in which said comparison means comprises:
    first amplifier means responsive to said first and second output signals for deriving a difference signal corresponding with the difference of the values thereof;
    second amplifier means having a first input responsive to said difference signal and a second input for receiving a reference input for providing a flow signal representing the rate of flow of said material within a predetermined range of said rates of flow; and
    condition responsive means for response to said flow signal.

10. The apparatus of claim 1 in which:
    said first thermally responsive sensor means and said heater means are mounted upon a common thermally conductive medium; and
    including shield means surmounting said first thermally responsive sensor means, said heater means and said second thermally responsive sensor means for thermally isolating them from their ambient environment.

11. The method for detecting the presence and measuring the flow of material comprising the steps of:
    positioning a first thermally responsive sensor upon a thermally conductive medium having a surface thermally influenced by said material to provide a first signal;
    applying heat to a region of said medium at a position remote from said first thermally responsive sensor to effect an exponential distribution of heat extending to and thermally influencing said first thermally responsive sensor;
    sensing the temperature of said material at a position remote and thermally isolated from said first thermally responsive sensor and said heated region to provide a reference signal; and
    treating said first signal and said reference signal to derive an output corresponding with the difference therebetween being substantially proportional to the logarithm of the rate of flow of said material.

12. The method of claim 11 wherein said application of heat is provided as a substantially constant power input to said conductive medium.

13. The apparatus of claim 9 wherein:
    said second reference input is selected having a value for establishing a minimum detectable level of said flow rate; and
    said second amplifier means includes a feedback path having an impedance selectable to establish a highest detectable said flow rate.

* * * * *